Dec. 18, 1923.

E. E. JOHNSON

COUPLING

Filed Feb. 13, 1920

1,478,124

INVENTOR:
EDWARD E. JOHNSON.
BY Whiteley and Ruckman
ATTORNEYS

Patented Dec. 18, 1923.

1,478,124

UNITED STATES PATENT OFFICE.

EDWARD E. JOHNSON, OF ST. PAUL, MINNESOTA.

COUPLING.

Application filed February 13, 1920. Serial No. 358,447.

*To all whom it may concern:*

Be it known that I, EDWARD E. JOHNSON, a citizen of the United States, residing at St. Paul, in the county of Ramsey and State of Minnesota, have invented certain new and useful Improvements in Couplings, of which the following is a specification.

My invention relates to couplings, and more particularly to couplings for use in connecting pump rods and other rods where it is desirable to connect adjacent ends of two or more rod sections. An object of my invention is to provide a coupling having such shape and having the parts thereof so arranged and proportioned that a strong and durable coupling may be manufactured expeditiously and economically.

The full objects and advantages of my invention will appear in connection with the detailed description thereof and the novel features embodied in my inventive idea will be particularly pointed out in the claims.

In the accompanying drawings, which illustrate my invention,—

Figure 1:
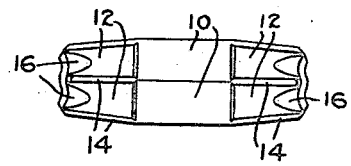
Figure 2:
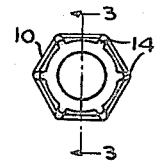
Figure 4:
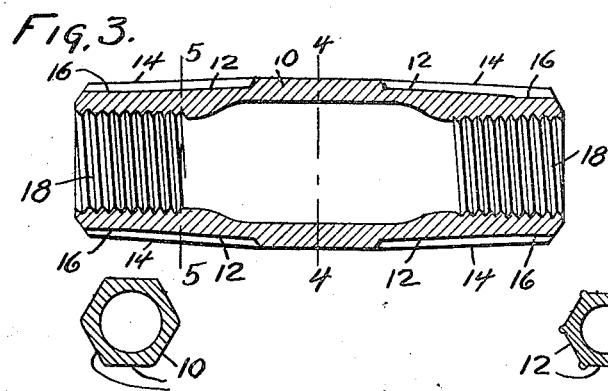
Figure 5:
Figure 6:
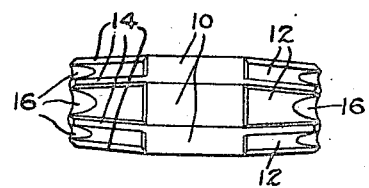
Figure 7:
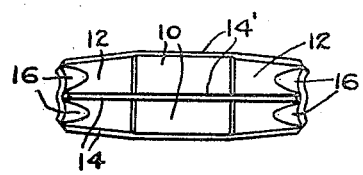

Fig. 1 is a view in side elevation. Fig. 2 is an end view. Fig. 3 is a view on an enlarged scale in longitudinal section on the line 3—3 of Fig. 2. Fig. 4 is a view in cross-section on the line 4—4 of Fig. 3. Fig. 5 is a view in cross-section on the line 5—5 of Fig. 3. Fig. 6 is a view in side elevation viewed from a different position from that shown in Fig. 1. Fig. 7 is a side elevational view of a slight modification.

Referring to the construction shown in the drawings, my coupling comprises a hollow member having a middle portion the exterior of which is polygonal in shape, the sides or faces being designated by the character 10 and the member having reduced end portions, the exterior of both end portions being polygonal in shape and the sides or faces being designated by the character 12.

The exterior configuration of the middle and end portions is polygonal in shape as stated, and preferably hexagonal. The sides or faces 12 are separated by ribs 14 which start flush with the sides 10 and converge slightly as they extend toward the ends of the coupling. The sides 12 are depressed below the level of the sides 10 and they may also converge slightly as they extend toward the ends of the coupling. The outer portions of the sides 12 have elevations 16 the surfaces of which are substantially parallel with the surfaces of the corresponding sides 10 respectively. The interior surface of the coupling is cylindrical, as shown in Figs. 4 and 5, and of reduced dimension at the two ends, which are provided with internal screw threads 18 as shown in Fig. 3. The coupling may be conveniently formed from suitable blanks or sections of metal pipe by compression in dies which act to compress the metal bodily inward and not only give it the proper shape but render it more dense and tough. The couplings are preferably pressed into shape by means of the machine disclosed in my application S. N. 358449 filed February 13, 1920. The couplings are strengthened by the ribs 14 which are provided by the surplus material which results when the ends of the blank are contracted in the dies. The elevations 16 also strengthen the internally-threaded end portions of the couplings and these elevations are formed by some of the surplus material which is provided when the ends of the blank are contracted in the dies. By referring to Figs. 4 and 5, in connection with Fig. 3 which shows the coupling in longitudinal section on an enlarged scale, it will be seen that the coupling includes a continuously tubular member having a middle portion, the interior of which is cylindrical in shape, and the exterior of which is polygonal in shape, the sides or faces of the polygon being designated by the numeral 10. The coupling also includes contracted or reduced end portions having a cylindrical interior form throughout and having the polygonal exterior surfaces 12 adjacent the middle portion which are warped into cylindrical form at the outer end of the coupling to constitute the elevations 16. The polygonal surfaces 12 are separated from each other by the outwardly projecting longitudinal ribs 14 which preferably begin flush with the corners of the polygonal middle portion and extend to the ends of the coupling. The ribs 14 and the elevations 16 thus serve a two-fold purpose in strengthening the finished coupling and in taking care of surplus material when the ends of the blank are contracted to form the reduced end portions. The end portions are interiorly threaded in the customary manner. The elevations 16 on account of being located on the inclined sides 12, and further on account of being substantially parallel with the faces of the middle portion, merge into the sides 12 of the polygonal-shaped ends. The surfaces of the elevations however, instead of being flat are curved in a circumferential direction, so that as shown in Fig. 2, the outer surface at each end of the coupling is a cylindrical surface broken at intervals by the outwardly-extending ribs 14. In practice it has been found that the making of the end portions of the coupling of hexagonal shape permits the retention of the inner cylindrical surface when the end portions are reduced by radial inward pressure in dies without any interior supporting mandrel.

In the modification shown in Fig. 7, the faces 10 of the middle portion of the coupling are separated at their longitudinal edges by ribs 14' which extend in line with the ribs 14 of the end portions, the construction being otherwise the same as shown in the other figures. This modified form of coupling therefore has an exterior polygonal shape, with longitudinal ribs extending for the full length of the coupling and separating the faces thereof. It is well-known that articles of polygonal shape which are turned by the application of a tool become rounded at the edges lying between the faces, so that the tool is liable to slip on account of failure to obtain a good hold on the article. By providing longitudinal ribs or ridges between the faces of the polygon, so that the tool engages the ribs rather than the faces, liability of the tool slipping is avoided.

I claim:

1. A coupling comprising a hollow member having a middle portion, and contracted interiorly-threaded end portions, the exterior surfaces of all of said portions being polygonal in shape and the faces on the exterior of said end portions converging as they extend from said middle portion, the outer ends of said faces being substantially parallel with the corresponding faces of said middle portion.

2. A coupling comprising a hollow member having a middle portion, contracted interiorly-threaded end portions, the exterior surfaces of said end portions being depressed below the exterior surface of said middle portion and all of said exterior surfaces being polygonal in shape and longitudinal ribs separating the faces upon the exterior of said end portions, said faces converging as they extend from said middle portion, the outer ends of said faces being substantially parallel with the corresponding faces of said middle portion.

3. A coupling comprising a continuously tubular member having a middle portion and contracted interiorly threaded end portions, the exterior surfaces of all of said portions being polygonal in shape, and all of the faces of said end portions being uniformly depressed below the faces of said middle portion, and outwardly projecting longitudinal ribs separating the exterior faces of said end portions the inner ends of said ribs being flush with the exterior surface of said middle portion.

In testimony whereof I hereunto affix my signature.

EDWARD E. JOHNSON.